June 9, 1953 L. G. SIMJIAN 2,641,310
MOUNTING MEMBER FOR FURNITURE AND THE LIKE
Filed April 8, 1950 2 Sheets-Sheet 1
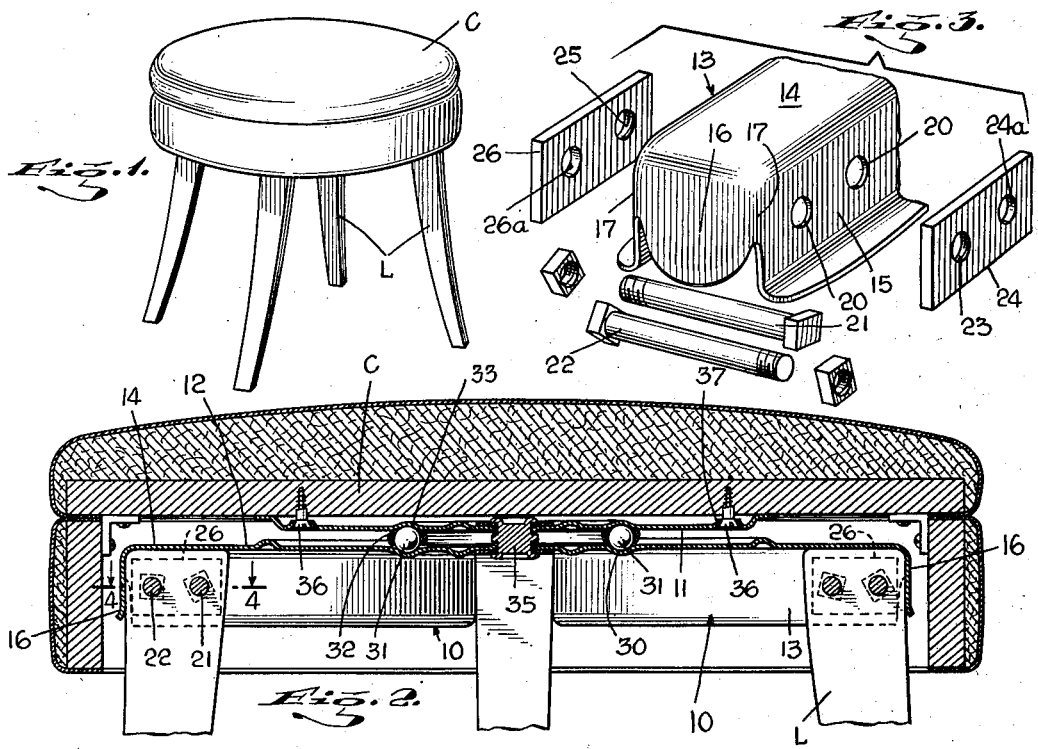
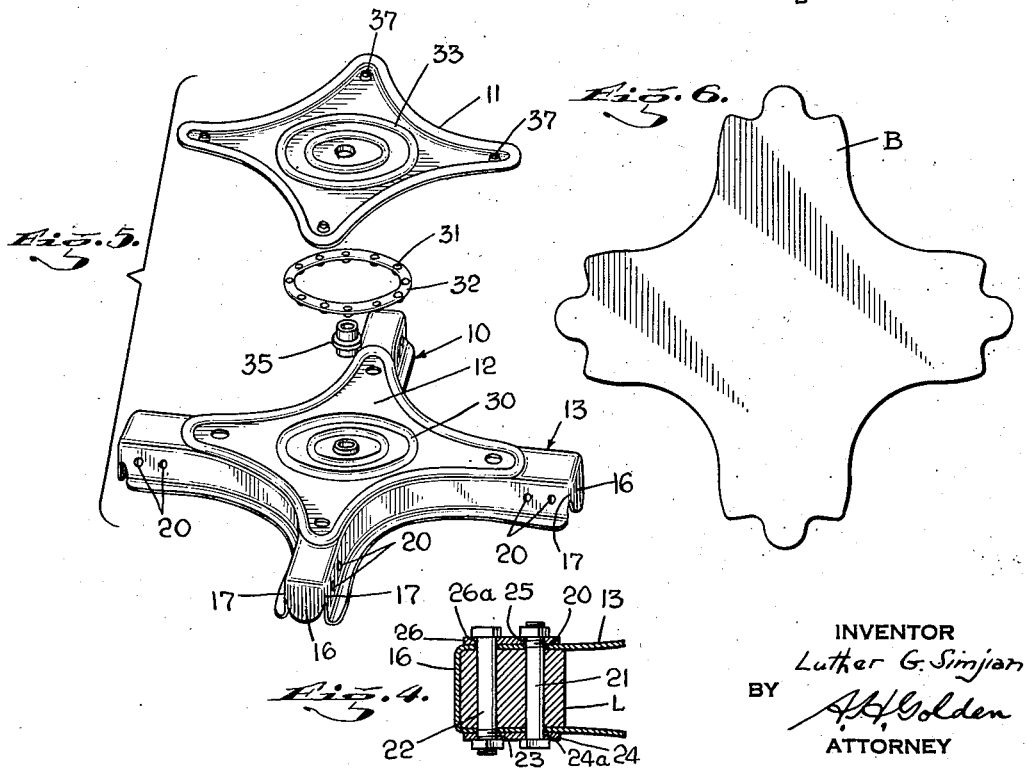
INVENTOR
Luther G. Simjian
BY
A. H. Golden
ATTORNEY June 9, 1953  L. G. SIMJIAN  2,641,310
MOUNTING MEMBER FOR FURNITURE AND THE LIKE
Filed April 8, 1950  2 Sheets-Sheet 2
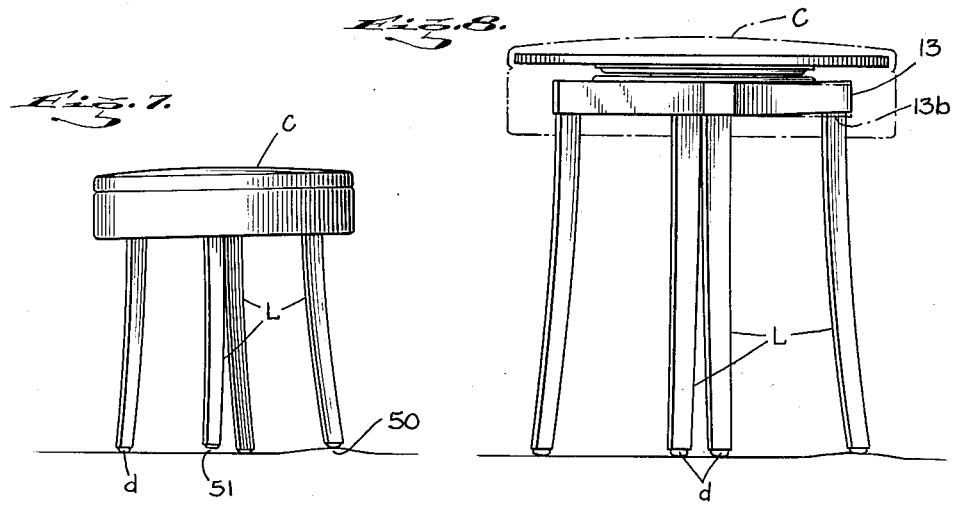
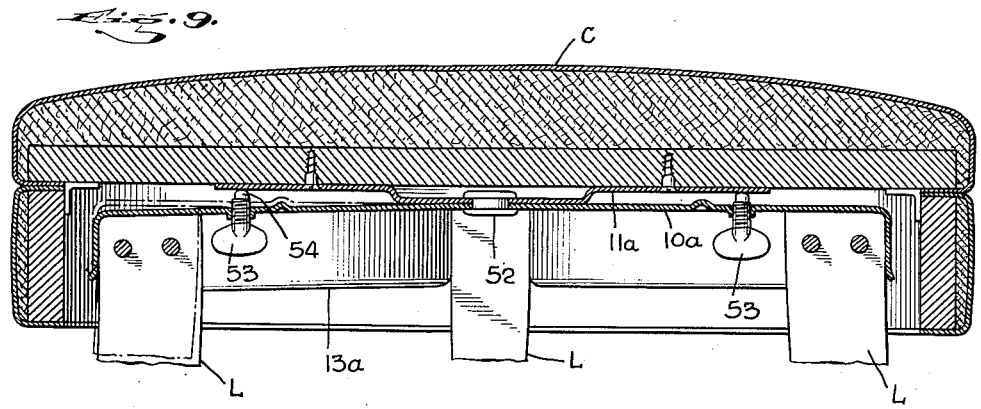
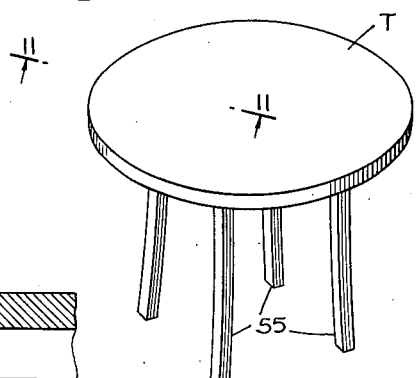
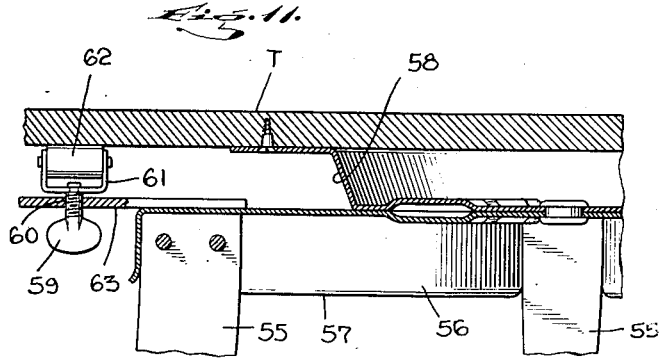
INVENTOR
LUTHER G. SIMJIAN
BY
ATTORNEY Patented June 9, 1953

2,641,310

UNITED STATES PATENT OFFICE 2,641,310

MOUNTING MEMBER FOR FURNITURE AND THE LIKE

Luther G. Simjian, Riverside, Conn., assignor to The Reflectone Corporation, Stamford, Conn., a corporation of Connecticut Application April 8, 1950, Serial No. 154,791

8 Claims. (Cl. 155—95)

This application is a continuation in part of my earlier application, Serial No. 121,548, filed October 15, 1949, and now abandoned.

This invention relates to a mounting member, and more particularly to a mounting member that is especially adapted for use in the assembly of such articles as furniture. Even more particularly, my invention relates to a mounting member in the form of a base that is particularly useful in the manufacture of any piece of furniture or similar structure having legs or other supports.

It is the particular object of my invention to contribute an extremely inexpensive mounting member especially adapted for use in articles of furniture, but useable elsewhere, all as will be quite apparent from an examination of the specification that follows.

As a feature of my invention, I utilize a base forming part of my mounting member and fabricated from sheet metal in an extremely novel and unusual manner whereby to yield a novel and effective structure. As a particular feature of my invention, my sheet metal base member is formed of a single sheet metal blank and includes a plurality of arms, each of which is at least partially channel-shaped and equipped with an end flange that is so particularly related to the flanges of the channel-shaped arms as to house a leg or similar structure in a most effective manner. However, because of the particular construction of each arm and the side and end flanges thereof, the flanges are readily adapted to yield, while still being of great strength so as to contribute considerable rigidity to the entire mounting member and the furniture of which it may form a part.

This yielding action is of a limited nature, and is utilized by me to contribute a self-aligning leg structure. Thus, where there are four or more arms on the base member, with each arm carrying a leg, it will be understood that the legs, when applied to an uneven floor, will normally contribute an unstable assembly and a teetering structure. However, because of the construction of my invention, the arms of the base member will yield prior to assuming a rigid form, and the legs carried by the arms will adjust themselves to the uneven floor to contribute a self-aligning assembly.

As a more particular feature of this part of the invention, the yielding action of each arm is outwardly, so that each arm acts as a cantilever, in effect. Moreover, the yielding by each arm is self-limiting, because of the inherent construction of the parts of my invention. Thereby, I obtain not only a self-aligning assembly of legs, but also a relatively rigid assembly, once the aligning has been completed.

As a further feature of my invention, the sheet metal base member is so formed also, when fabricated, as to house ball or roller bearings on which may be mounted a superimposed bearing plate, also sheet metal, and readily and easily assembled to the base member to form the complete mounting member to which I have already alluded.

As a more particular feature of this part of the invention, the legs of my structure are each adapted to carry a bearing member at the lower end thereof to allow slipping or sliding of the legs during the adjusting movement thereof with the arms of the base member. Thereby, the friction between the legs and the floor is reduced to facilitate movement of the legs, as will be apparent to those skilled in the art.

As a still further feature of my invention, the individual legs of my invention may be adjusted permanently relatively to the base member of which they are a part, so as to maintain them permanently in a particular adjusted position relatively to a floor. Thus, through the utilization of adjusting means, a particular arm may be adjusted permanently relatively to the chair, table top, or other member carried by the base member. Further, where this table top, chair base, etc., is rotatable relatively to the base member, the adjustment may be made through roller means that will permit rotation of the table top, chair, etc., relatively to the legs of the base member.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims to be granted me shall be of sufficient breadth to prevent the appropriation of my invention by those skilled in the art.

Referring now to the drawings, Fig. 1 is a perspective view of a typical article of furniture that may be formed through the utilization of my invention. Fig. 2 is a vertical section through the article of furniture of Fig. 1, showing the construction of my invention. Fig. 3 is an exploded view illustrating particularly the construction of each of the arms of the base member of my invention. Fig. 4 is a section taken along lines 4—4 of Fig. 2. Fig. 5 is a perspective view showing in exploded relation the several parts of my invention. Fig. 6 is a plan view of the blank from which the base member of my invention is fabricated.

Fig. 7 is an elevation showing a stool utilizing my invention applied to an uneven floor. Fig. 8 illustrates just how one of the arms of the base member of my invention yields so that the four legs of the stool of Fig. 7 adjust themselves to an uneven floor when weight is imposed upon the said legs. Fig. 9 is a sectional view showing just how one of the legs is adjusted permanently relatively to a structure superimposed upon the base member of my invention. Fig. 10 is a perspective view of a table to which my invention may be applied. Fig. 11 is a section taken along lines 11—11 of Fig. 10 illustrating roller means for adjusting one of the legs relatively to the table top so that the legs will conform to a floor while the table top itself remains rotatable.

Referring now more particularly to the drawings, the mounting member of my invention comprises a base member 10 best shown in Fig. 5, and a superimposed bearing plate 11, also shown in Fig. 5. At this point it will be well to indicate that while I shall claim the general combination of my invention, I do consider that the construction of the base member 10 is per se an extremely important contribution, and I shall claim the construction of this base member per se, as well as the general combination of which it is a part.

For forming the base member 10, I utilize the blank B illustrated in Fig. 6. The dies that form the base member 10 from the blank B are so designed that in operating on the blank B they will shape the blank into that form illustrated in Fig. 5 so that the finished base member will have a central portion 12 and a series of arms, here shown to be four in number and each designated 13. Preferably, the base surface 14 of each arm 13 will lie substantially in the plane of the central portion 12, and as is best seen in Fig. 3 as well as Fig. 5, there will extend from the base surface of each arm a pair of side flanges 15.

At the end of each of the base surfaces 14 there will extend an end flange 16 that is also well illustrated in Fig. 3. It should be particularly noted that the end flange 16 is integral with the side flanges 15 for a rather considerable distance from the base surface 14. Ordinarily, in the forming of the arms, if the general teachings of sheet metal fabrication were followed, there would be a line of separation as at 17 between the side flanges 15 and the end flange 16 of each arm 13. Because of the construction of the parts as described and illustrated, it is obvious that the end flange 16 will be extremely strong and will be held securely in position through its integral relationship with the side flanges 15 along lines 17. Moreover, it will be noted that the side flange of one arm continues preferably into the side flange of the next arm, and so on, to strengthen further the entire member.

Each of the side flanges 15 of each arm 13 is drilled as illustrated at 20 in Figs. 3 and 4 for the passage of a pair of oppositely related bolts 21 and 22. Bolt 22 will traverse the opposed bores 20 and will enter the screw-threaded bore 23 of a retaining plate 24 adapted to be positioned against one of the flanges 15 while traversing also the untapped bore 26a of an opposed retaining plate 26. The other bolt 21 will traverse the bores 20 of the side flanges 15 in an opposed direction and will enter the threaded bore 25 of the plate 26, traversing also the untapped bore 24a of plate 24. If the leg L of an article of furniture such as that shown in Fig. 1 is inserted between the side flanges 15 and against the end flanges 16 of each of the arms 13, it will readily be secured by the bolts 21, 22 in assembled relation to the said arms 13 as well illustrated in Figs. 2 and 3. Moreover, each of the end flanges 16 wil coact with the legs L to hold them securely and in reinforced and rigid relation to the several arms 13. Further, because the sheet metal of the blank B is relatively thin and spring-like, the flanges 15 will yield under the stress of bolts 21, 22 so as to be clamped securely against the sides of the legs L whereby not only to hold the legs in position, but also to resist the release rotation of the bolts 21, 22.

It is quite obvious that the base 10 may be used as a separate device to have a series of legs L secured thereto, the term legs here being used in its broadest sense, and then to carry a table top, a chair top, or be part of any other construction desired. I do prefer, however, to use the base member 10 to support a bearing plate 11, the bearing plate 11 to carry thereon preferably a chair seat, although conceivably the bearing plate 11 may also hold a table top such as that adapted for a lazy Susan.

In order to mount the bearing plate 11, the base member 10 has formed therein a groove 30 in which may be placed a series of ball bearings 31 preferably separated by a ring 32. Bearing plate 11 is formed with a bearing groove 33 complementary to the bearing groove 30 whereby it may be applied to the ball bearings 31 as well illustrated in Fig. 2. An assembly sleeve member 35 may be spun into assembled relation to the bearing plate 11 and base member 10 to hold the two parts as illustrated in Fig. 2, and with the ball bearings 31 securely retained in bearing relation.

If a chair top C is now screwed to the bearing plate 11 as by a series of four screws 36 entering the holes 37 of the bearing plate 11, it will be rotatably mounted in assembled relation to the base member 10, all as will be quite apparent. Those skilled in the art will now apreciate that through the extremely simple and novel, though inexpensive, structure of the base member 10, I make available to the art a device that can be utilized readily for the assembly of a desirable article of furniture such as a table, chair, lazy Susan, etc.

In Fig. 7 the chair C is shown with its legs L applied to an uneven floor in which there is formed a bump 50. Because of this bump 50, it will be seen that the chair is unstable, with one leg spaced from the floor a distance 51. Fig. 8 shows just what happens when a weight is applied to the chair C, as when the chair is occupied. At that time, one of the arms 13 will flex, moving from its dash and dotted line position 13b to its upper full line position designated by reference numeral 13. This flexing or yielding movement is sufficient to allow the entire leg structure to adjust itself to the floor, bringing all four legs L against the floor. The movement thus contributed to one of the arms 13 is of an outward flexing nature with the flanges 15 limiting the flexing of the legs and giving the legs rigidity in their flexed position. This part of my invention is important to prevent a collapse of the structure. In other words, the arms will yield under a weight to allow that adjusting movement of the legs that is necessary, but this adjusting yielding movement is self-limiting so as to contribute a stable rigid chair. I believe that the rather important contribution of this part of my invention will now be apparent to those skilled in the art.

To make possible the ready flexing of the leg supporting arms, the lower end of each leg carries an anti-friction dome d. This dome allows that slight sliding of any leg moving relatively to the floor during the flexing of the arm to which it is secured.

In Fig. 9 the base member of my invention is designed by reference numeral 10a to distinguish it from the base member 10 of Figs. 2 and 5. Actually, base member 10a differs from base member 10 only in that it is not equipped with a groove for carrying ball bearings. Similarly, bearing plate 11a differs from bearing plate 11 in that it does not have a bearing groove for ball bearings, but rather is assembled to base member 10a by a simple eyelet 52. The seat of the chair C is secured to the mounting member 11a in exactly the same manner as in Fig. 2. The arms 13a of the base member 10a will flex in a limited manner just exactly as do the legs 13 of the mounting member 10. However, in the modification of Fig. 9 this flexing may be utilized in obtaining a permanent adjustment of one or more of the legs relatively to the chair or the bearing plate 11.

For the particular purpose a wing bolt 53 is placed in threaded relation to one or more of the arms 13a, and is equipped with a thrust portion 54 adapted to bear against the bearing plate 11a. The left leg in Fig. 9 is shown in dash and dotted lines in its upper unadjusted position and in solid lines in its lower adjusted position to which is has been moved by clockwise rotation of the wing bolt 53. Obviously, the left leg L and its arm 13a will be maintained in a permanently flexed position in the particular assembly illustrated in Fig. 9 so that the chair will be permanently adjusted to a particular defective floor.

It frequently becomes desirable to adjust a particular leg to a table top, while permitting rotation of the table top. For a description of this part of my invention, reference is made to Figs. 10 and 11 wherein a table is shown equipped with a top T and a series of legs 55. Each leg 55 is secured to one of a series of resilient arms 56 forming part of a base member 57 that is substantially the same as the base member 10 of the first modification, and 10a of the second modification. Rotatably carried by this base member 57 is a bearing member 58 to which is secured a table top T. At least one of the arms 56 of the base member 57 is preferably equipped with an extension arm 63, and carried by this extension arm 63 is a wing bolt 59 in threaded relation thereto at 60. Moreover, the upper end of the wing bolt 59 rotatably carries a bifurcated bracket 61 on which is mounted for rotation a roller 62. Roller 62 presses against the under side of the table T, and by rotation of the wing bolt 59 in a clockwise direction, this pressure may be increased as desired, and thereby effect the flexing of the arm 56 to which the extension arm 63 is fastened. This will, of course, permanently flex the arm 56 so as to adjust the leg 55 to a particular floor. This adjustment will not prevent rotation of the table top T, and this rotation is possible while allowing roller 62 to hold arm 56 and leg 55 in adjusted position. Of course, if desired, the wing bolt 59 could be threaded directly onto the arm 56, all as is quite obvious.

I believe that those skilled in the art will understand the value of my invention and the nature of my contribution to the art.

I now claim:

1. In a combination of the class described, a sheet metal base member formed of a single thin flexible flat blank and comprising a central portion lying generally in a base plane, a seat mounted on said base member, leg carrying arms extending integrally from said central portion and comprising each a base surface lying substantially in said base plane with opposed side flanges integral with said base surface extending at substantially right angles from said base surface, vertically extending legs secured to each of said arms, said arms being of such length relatively to said central portion that the thin sheet metal of said base member and arms is readily flexed by said legs to bring the lower ends of the legs all against an uneven floor or the like, and said flanges acting to contribute rigidity to said base member and limiting the flexing of said arms to align the legs carried thereby to an uneven floor or the like.

2. In a combination of the class described, a sheet metal base member having a central portion and a series of leg carrying arms extending therefrom, a leg secured to each arm said sheet metal being resilient to allow flexing of said base member as may be necessary to adjust the legs carried by said arms so that all of the ends of the legs will be in contact with an uneven floor when weight is applied to said base member, a support member carried by said base member, and means extending between said support member and said base member for flexing one or more of said arms relatively to the rest of said base and support members.

3. In a combination of the class described, a sheet metal base member having a central portion and a series of leg carrying arms extending therefrom, said sheet metal being resilient to allow flexing of said arms as may be necessary to adjust the legs carried by said arms so that all of the ends of the legs will be in contact with an uneven floor, a support member carried by said base member, and screw threaded means extending between said support member and said base member for flexing one or more of said arms.

4. In a combination of the class described, a sheet metal base member having a central portion and a series of leg carrying arms extending therefrom, said sheet metal being resilient to allow flexing of said arms as may be necessary to adjust the legs carried by said arms so that all of the ends of the legs will be in contact with an uneven floor, a support member, means rotatably mounting said support member on said base member, means extending between said support member and said base member for the flexing of the base member to adjust one or more of said arms relatively to the rest of said base and support members, and a roller forming part of said means and bearing against said support member while allowing rotation of said support member relatively to said base member.

5. In a combination of the class described, a sheet metal base member formed of a single blank of thin flexible sheet metal having a central portion and a series of arms extending therefrom, the upper base surfaces of said central portion and arms lying substantially in a single plane with shallow grooves in said surfaces lying out of said plane, each of said arms having a pair of spaced side flanges integral with the base upper surface thereof whereby each arm is channel shaped, a leg secured to each of said arms between said flanges and in the channel formed thereby, said arms being of such length relatively to said central portion whereby to flex the thin flexible sheet metal when said legs are applied to a floor and a load is supported on said base member.

6. In a combination of the class described, a sheet metal base member formed of a single blank of thin flexible sheet metal having a central portion and a series of arms extending radially therefrom, an upper bearing member secured to said central portion to be carried thereby, each arm having a pair of opposed side flanges integral with the base upper surface thereof whereby each arm is channel shaped, an end flange for each channeled arm formed of metal integral with said blank, a leg for each arm positioned between said side flanges and against said end flange, said arms being of such length relatively to said central portion as to flex said thin flexible sheet metal when said legs are applied to a floor and a load placed on said upper bearing member.

7. In a combination of the class described, a sheet metal base member formed of a single blank of thin flexible sheet metal having a central portion and a series of arms extending radially therefrom, the upper surfaces of said arms and said central portion lying substantially in a single plane with grooves therein bottoming outwardly of said plane, a groove in said central portion formed circularly and concentrically thereof, ball bearings in said circular groove, an upper bearing plate resting on said ball bearings, means retaining said upper bearing plate assembled to said base member with the ball bearings therebetween, a furniture part carried on said bearing plate, a leg secured to the end of each of said arms, said arms being of such length relatively to the said central portion as to flex the thin flexible sheet metal when said legs are applied to a floor and load placed on said furniture part.

8. In a combination of the class described, a sheet metal base member formed of a single blank of thin flexible sheet metal having a central portion and a series of arms extending radially therefrom, an upper bearing member secured to said central portion to be carried thereby, each arm having a pair of opposed side flanges integral with the base surface thereof whereby each arm is channel shaped, a leg for each arm positioned between said side flanges and in the channel formed thereby, said arms being of such length relatively to said central portion as to flex said thin flexible sheet metal when said legs are applied to a floor and a load placed on said upper bearing member.

LUTHER G. SIMJIAN.

References Cited in the file of this patent

UNITED STATES PATENTS

| Number | Name | Date |
|---|---|---|
| 72,635 | Heywood | Dec. 24, 1867 |
| 435,723 | Barnes | Sept. 2, 1890 |
| 705,237 | Hatch | July 22, 1902 |
| 875,494 | Bedell | Dec. 31, 1907 |
| 1,337,059 | Fischer | Apr. 13, 1920 |
| 1,810,817 | Brainard | June 16, 1931 |
| 2,170,006 | Brandt | Aug. 22, 1939 |
| 2,256,677 | Jones | Sept. 23, 1941 |
| 2,490,210 | Cramer et al. | Dec. 6, 1949 |
| 2,528,949 | Engstrom | Nov. 7, 1950 |